United States Patent [19]

McManus et al.

[11] Patent Number: 4,622,212

[45] Date of Patent: Nov. 11, 1986

[54] HYDROGEN SULFIDE REMOVAL

[75] Inventors: Derek McManus, Palatine; Frederick R. Kin, Park Forest, both of Ill.

[73] Assignee: ARI Technologies Inc., Palatine, Ill.

[21] Appl. No.: 748,148

[22] Filed: Jun. 25, 1985

Related U.S. Application Data

[63] Continuation of Ser. No. 548,294, Nov. 3, 1983, abandoned.

[51] Int. Cl.$^4$ ............................................. C01B 17/16
[52] U.S. Cl. .................................. 423/226; 423/573 R; 423/573 G; 252/189
[58] Field of Search .............. 423/573 G, 573 R, 226; 252/189

[56] References Cited

U.S. PATENT DOCUMENTS

| | | | |
|---|---|---|---|
| 3,622,273 | 11/1971 | Roberts et al. | 23/225 R |
| 3,972,989 | 8/1976 | Fenton et al. | 423/226 |
| 4,009,251 | 2/1977 | Meuly | 423/573 G |
| 4,017,594 | 4/1977 | Fenton et al. | 423/573 R |
| 4,189,462 | 2/1980 | Thompson | 423/226 |
| 4,278,646 | 7/1981 | Lynn et al. | 423/226 |
| 4,325,936 | 4/1982 | Gowdy et al. | 423/573 R |
| 4,382,918 | 5/1983 | Diaz | 423/573 R |
| 4,388,293 | 6/1983 | Diaz | 423/226 |
| 4,402,930 | 9/1983 | Diaz | 423/573 |
| 4,421,733 | 12/1983 | Blytas | 423/573 R |
| 4,436,714 | 3/1984 | Olson | 423/573 G |
| 4,541,998 | 9/1985 | Weber | 423/226 |

FOREIGN PATENT DOCUMENTS

| | | | |
|---|---|---|---|
| 999799 | 7/1965 | United Kingdom | 423/226 |
| 999800 | 7/1965 | United Kingdom | 423/226 |

Primary Examiner—R. L. Andrews
Attorney, Agent, or Firm—Marshall, O'Toole, Gerstein, Murray & Bicknell

[57] ABSTRACT

In a cyclic hydrogen sulfide oxidation-catalyst regeneration process using an aqueous chelated polyvalent metal catalyst solution, excessive degradation of the aminopolycarboxylic acid chelating agent is prevented by incorporating in the solution an effective amount of a stabilizing agent capable of retarding or preventing rupture of nitrogen-carbon bonds in the chelating agent during oxidative regeneration of the catalyst solution. Alkaline thiosulfates are the preferred stabilizing agents. Particularly good results are obtained using an alkaline thiosulfate stabilizer in a catalyst solution comprising the dimer form of the NTA-iron complex.

40 Claims, 5 Drawing Figures

HYDROGEN SULFIDE REMOVAL

This application is a continuation of application Ser. No. 548,294, filed Nov. 3, 1983 and now abandoned.

This invention relates to an improved continuous cyclic process for removing hydrogen sulfide from a fluid stream by contacting the stream with a chelated polyvalent metal catalyst solution and regenerating the catalyst solution for reuse in the process. More particularly, the invention relates to a method of preventing excessive degradation and loss of an aminopolycarboxylic acid chelating agent during the operation of a hydrogen sulfide removal process of the foregoing type.

BACKGROUND OF THE INVENTION

The use of an aqueous chelated iron catalyst solution for removing hydrogen sulfide from a gas stream is well known in the art. The solution is contacted with the hydrogen sulfide-containing gas to effect oxidation of the hydrogen sulfide to elemental sulfur and concomitant reduction of the iron from its ferric state to its ferrous state. The solution is regenerated for reuse by contacting it with an oxygen-containing gas to oxidize the iron from its ferrous state to its ferric state. The following U.S. patents are illustrative of a process of this type:

| Inventor | U.S. Pat. No. | Date |
| --- | --- | --- |
| Hartley et al | 3,068,065 | Dec. 11, 1962 |
| Pitts et al | 3,097,925 | July 16, 1963 |
| Meuly et al | 3,226,320 | Dec. 28, 1965 |
| Roberts et al | 3,622,273 | Nov. 23, 1971 |
| Roberts et al | 3,676,356 | July 11, 1972 |
| Sibeud et al | 3,897,219 | July 29, 1975 |
| Salemme | 3,933,993 | Jan. 20, 1976 |
| Meuly | 4,009,251 | Feb. 22, 1977 |
| Mancini et al | 4,011,304 | Mar. 8, 1977 |
| Sibeud et al | 4,036,942 | July 19, 1977 |
| Hardison | 4,076,621 | Feb. 28, 1978 |
| Winkler | 4,091,073 | May 23, 1978 |
| Thompson | 4,189,462 | Feb. 19, 1980 |
| Thompson | 4,218,342 | Aug. 19, 1980 |
| Hardison | 4,238,462 | Dec. 9, 1980 |
| Lynn et al | 4,278,646 | July 14, 1981 |
| Lynn | 4,330,478 | May 18, 1982 |
| Blytas et al | 4,348,368 | Sept. 7, 1982 |
| Diaz | 4,368,178 | Jan. 11, 1983 |
| Primack | 4,374,104 | Feb. 15, 1983 |
| Diaz | 4,382,918 | May 10, 1983 |
| Diaz | 4,388,293 | June 14, 1983 |
| Blytas | 4,390,516 | June 28, 1983 |
| Diaz | 4,400,368 | Aug. 23, 1983 |
| Diaz | 4,402,930 | Sept. 6, 1983 |

The above-listed Roberts et al patents refer to Czechoslovakian Pat. Nos. 117,273, 117,274, and 117,277 as also disclosing the use of aqueous chelated iron solutions for the same purpose. In addition, British Pat. Nos. 855,421, 99,799, and 99,800 also relate to hydrogen sulfide removal processes utilizing aqueous chelated iron solutions.

Many of the prior art patents in this field appear to be based on a limited amount of small-scale experimental work. Consequently, the disclosures of such patents do not recognize or purport to solve the principal operating problem that has been encountered in prolonged large-scale operation of a hydrogen sulfide removal process of this type utilizing an aminopolycarboxylic acid chelating agent. For example, many of the above-mentioned prior art patents express concern about the formation of acidic oxides of sulfur, such as thiosulfates, particularly at the neutral or alkaline pH levels most effective for hydrogen sulfide removal. The prior art has proposed the addition of organic amines, buffering agents, and other additives to the chelated iron solution to inhibit or minimize thiosulfate formation. Other expedients have also been suggested, such as periodic withdrawal of part of the recirculating chelated iron solution to control the accumulation of thiosulfate, or operating the process at a lower pH level to discourage thiosulfate formation.

In commercial-scale operation of a process of this type, however, we have found that thiosulfate formation and accumulation is not a troublesome problem. As explained in more detail below, we have found that chemical degradation and loss of the aminopolycarboxylic acid chelating agent necessitating addition of replacement chelating agent is the most significant operating problem affecting the economic feasibility of prolonged large-scale operation of the process.

A few of the prior art workers have acknowledged that chelated iron solutions are "unstable" and that undesirable precipitation of iron compounds may occur. For example, British Pat. No. 999,799 recommends close adjustment of pH to avoid breakdown of the chelate complex. British Pat. No. 999,800 suggests careful control of the regeneration of the catalyst solution to avoid over-oxidation of the iron chelate. U.S. Pat. No. 4,189,462 to Thompson indicates that restricting the molar ratio of EDTA to iron is an important consideration in avoiding breakdown of the chelate molecule. U.S. Pat. No. 4,330,478 to Lynn suggests the use of specific types of aliphatic polycarboxylic acid chelating agents that are allegedly more resistant to oxidation. U.S. Pat. No. 3,622,273 to Roberts et al discloses the addition of selected buffering agents to maintain the pH at a relatively high level at which the chelated iron complex is said to be more stable. U.S. Pat. No. 4,278,646 to Lynn et al suggests the addition of selected amine salt stabilizers to achieve chelate stability at low pH levels. The Diaz U.S. Pat. Nos. 4,382,918, 4,388,293, and 4,400,368 propose the addition of various sulfur-containing and nitrogen-containing compounds as stabilizers to reduce the rate of chelate degradation, but the reported data show only a relatively modest improvement in the chelate loss.

Before the present invention, the prior art has not provided an effective, environmentally acceptable, and inexpensive solution to the problem of chelate degradation. Moreover, there has been no adequate explanation of the mechanism of chelate instability in a hydrogen sulfide removal process.

SUMMARY OF THE INVENTION

From an intensive experimental investigation of the catalyst instability problem, it has been found that progressive chemical degradation of an aminopolycarboxylic acid chelating agent occurs by severance or rupture of nitrogen-carbon bonds in the aminopolycarboxylic acid portion of the chelated polyvalent metal complex during oxidative regeneration of the catalyst solution. It is believed that when the polyvalent metal is reduced to its lower valence state during the hydrogen sulfide oxidation step, a nitrogen-iron bond is released resulting in the presence of a nitrogen atom in an excited or activated state. Subsequently, during regeneration of the solution to oxidize the polyvalent metal to its higher valence state, nitrogen-carbon bond rupture occurs at the site of the activated nitrogen atom.

In accordance with the present invention and based on the foregoing mechanism of chelate degradation, we have discovered that certain stabilizing agents when incorporated in the catalyst solution are remarkably effective for retarding or preventing the nitrogen-carbon bond rupture that results in degradation of the aminopolycarboxylic acid chelating agent. In particular, highly successful results are obtained using nitrilotriacetic acid (NTA) as the chelating agent and an alkaline thiosulfate as the stabilizing agent. Other effective stabilizing additives are t-butanol and ethylene glycol.

Accordingly, the broad object of the present invention is to improve the economic feasibility of a hydrogen sulfide removal process using an aqueous catalyst solution of a polyvalent metal chelated with an aminopolycarboxylic acid chelating agent.

A more specific object of the invention is to provide a novel and improved method of preventing excessive degradation and loss of the aminopolycarboxylic acid chelating agent in a process of the aforementioned type.

A further object of the invention is to provide a novel and improved catalyst composition for a process of the foregoing type by incorporating in the aqueous chelated polyvalent metal solution an effective amount of a relatively inexpensive and environmentally acceptable stabilizing agent that is capable of preventing excessive degradation of the aminopolycarboxylic acid chelating agent.

Other objects and advantages of the invention will be understood from the subsequent detailed description.

DETAILED DESCRIPTION

Figure 1:
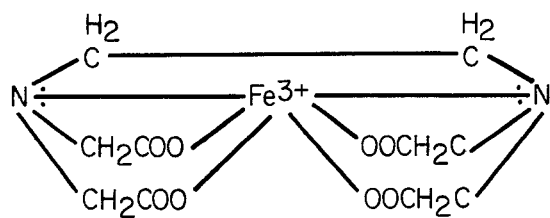
FIGS. 1 and 2 are schematic representations of the chelate complex formed by EDTA and iron in its oxidized or ferric state and its reduced or ferrous state, respectively.

As previously explained, although some of the prior art patents relating to hydrogen sulfide removal using an aqueous chelated iron catalyst solution have acknowledged that the solutions are "unstable" and that precipitation of iron compounds may occur, there has been no recognition of the practical significance of this problem. Furthermore, there has been no adequate explanation or understanding of the mechanism involved in the instability of the chelated iron solution. Instead, many of the prior art patents appear to direct their principal attention to an alleged problem of thiosulfate formation and accumulation in the catalyst solution.

In laboratory work or small-scale commercial operations using an aminopolycarboxylic acid chelated iron solution it may appear that loss of the chelating agent is not a serious problem and can be attributed to discard of the chelating agent with the sulfur slurry product of the hydrogen sulfide oxidation step. As a result of prolonged operation of large-scale processing units in a commercial environment, however, it has been found that consumption of the aminopolycarboxylic acid chelating agent is much greater than was expected from laboratory-based estimates. In a small-scale operation, the loss of chelating agent may appear to be tolerable because the total chemical cost is still relatively low. When the process is carried out on a large scale for a prolonged time, the minor unavoidable losses of chelating agent become trivial as compared with the chemical degradation taking place,. and consumption of the aminopolycarboxylic acid chelating agent by chemical degradation neccessitating addition of replacement chelating agent becomes the most important problem in the operation of the system. Furthermore, it has also been found that under most circumstances thiosulfate formation is not a serious problem, particularly when the process is carried out in an anaerobic regime utilizing separate vessels or reaction zones for hydrogen sulfide absorption and for oxidative regeneration of the solution. Although thiosulfate is formed as a byproduct of the hydrogen sulfide removal step, the amount formed is small, usually less than 5%, and little or no further accumulation of thiosulfate is found in the operating solution.

As a result of an intensive experimental investigation, we have developed an explanation and understanding of the mechanism of chemical degradation of the aminopolycarboxylic acid chelating agent, and based on this mechanism, we have also discovered a remarkably effective method of retarding or preventing such degradation.

It has been widely recognized that the most effective polyvalent metal chelating agents for purposes of hydrogen sulfide removal are those of the aminopolycarboxylic acid type typified by ethylene diaminetetraacetic acid (EDTA) and its homologues and closely related compounds. Unfortunately, it is this type of chelating agent that degrades rapidly in a cyclic hydrogen sulfide removal process wherein the aqueous chelated polyvalent metal solution is used for hydrogen sulfide removal and regenerated by oxidation or aeration.

Figure 2:
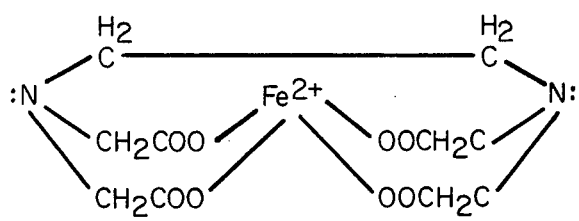

FIGS. 1 and 2 are schematic representations of the complexes formed by tetrasodium EDTA and iron in an aqueous solution. In FIG. 1, six complexing ligands or "hooks" are attached to the iron in its ferric form and satisfy all of its ordinary coordination requirements. Four of the hooks are associated with acetic acid ligands and two are satisfied by bonds between the iron and the two nitrogens in each EDTA molecule. Although not illustrated in the schematic representation of FIG. 1, it has also been suggested in the literature that a seventh bond pair exists between the iron and a hydroxyl ion or between the iron and an oxygen bridge to another mirror image complex.

As is well known, when an aqueous solution of the EDTA-iron complex is utilized to absorb hydrogen sulfide from a gas stream, the hydrogen sulfide is oxidized to elemental sulfur and at the same time the iron is reduced from its higher valence ferric state to its lower valence ferrous state so that the coordination number of the iron is changed from six to four. FIG. 2 illustrates this form of the complex in which the iron is in its ferrous or lower valence state. Since the coordination number of the iron changes from six to four, two of the iron bonds must be freed, i.e. either iron-carbon or iron-nitrogen bonds. As reflected in FIG. 2, however, it is believed that the release of iron-nitrogen bonds is the cause of the degradation of the aminopolycarboxylic acid molecule.

In FIG. 1, each nitrogen is shown with an electron pair shared with the iron. This arrangement satisfies the tendency of nitrogen to involve all the outer shell electrons and results in an extremely stable configuration. Aqueous solutions of EDTA-chelated ferrous iron and NTA-chelated ferric iron have been aerated at ambient conditions for many hours without any measurable degradation of the chelate complex or the chelating agent. However, during operation of the hydrogen sulfide removal process when the iron in the complex is reduced from the ferric state to the ferrous state during the oxidation of hydrogen sulfide, it appears that the pyramidal structure of the nitrogen is inverted leaving an unsatisfied nitrogen complexing site, as illustrated in FIG. 2 by the electron pair facing outward from the chelate ring. Thus, in the FIG. 2 configuration it is believed that the nitrogen is in an excited or activated state such that during subsequent oxidative regeneration of the catalyst solution the nitrogen-carbon bonds along the backbone of the EDTA molecule are ruptured as a result of the loss of an unpaired electron from the nitrogen.

Figure 3:
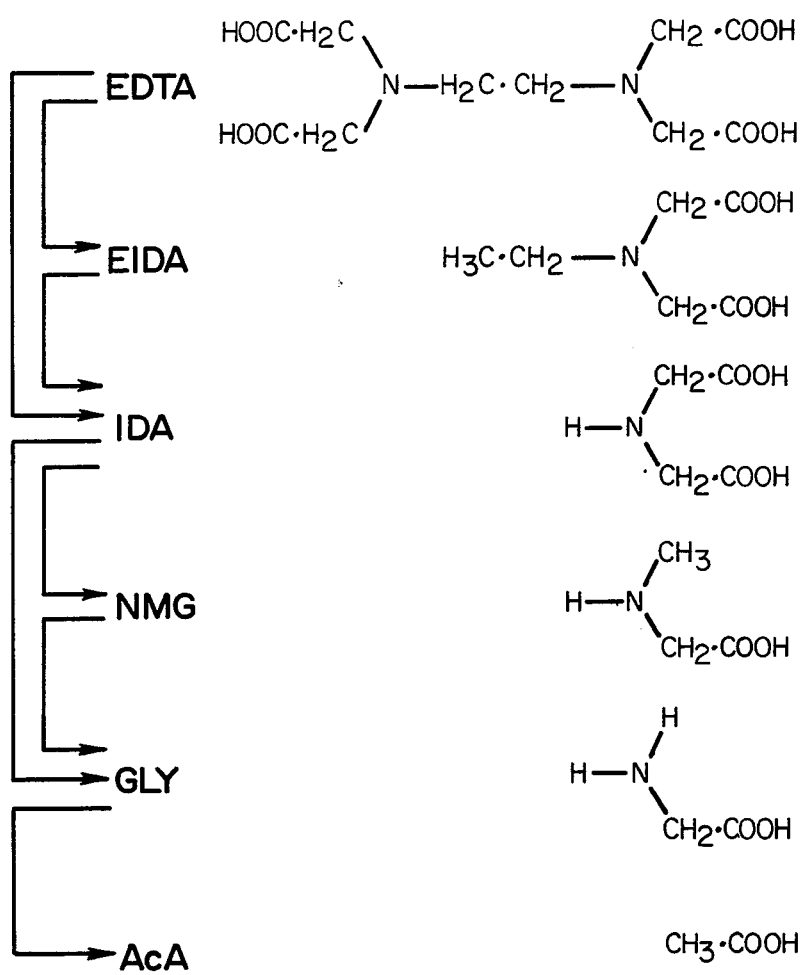
FIG. 3 is a chart showing the primary and secondary degradation products of EDTA.

Using liquid chromatography techniques, we have determined that the primary degradation products of EDTA are ethyl imino diacetic acid (EIDA) and imino diacetic acid (IDA), these two materials accounting for substantially all of the EDTA which disappears from the catalyst solution during oxidative regeneration. FIG. 3 is a chart showing the progressive chemical degradation of EDTA. The primary degradation products are EIDA and IDA, but we have also found that the IDA ultimately undergoes further degradation, probably to N-methylglycine and glycine or glycine-related compounds, with the ultimate degradation product being acetic acid.

Figure 4:
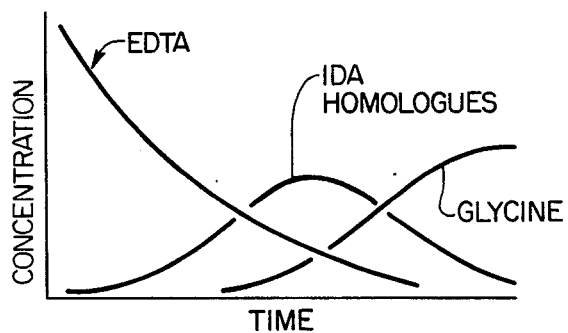
FIG. 4 is a graph showing the rate of primary and secondary degradation of EDTA.

Our investigation has also shown that the rate of degradation of EDTA far exceeds the apparent rate of loss of catalyst activity when the EDTA chelated iron solution is used in a cyclic hydrogen sulfide removal process. It was determined that the primary degradation products, IDA and its homologues, do not degrade as fast as EDTA but that the degradation rate is still high enough to preclude operation at high iron concentrations without substantial additions of EDTA either periodically or continuously. In FIG. 4, the curve labeled "EDTA" shows the rapid progresive degradation and loss of EDTA that occurs when an aqueous EDTA-chelated iron solution is used for hydrogen sulfide absorption and subjected to oxidative regeneration in repetitive cycles. The curve labeled "IDA Homologues" shows that the concentration of primary degradation products in the solution increases to a maximum and then decreases as secondary degradation of IDA occurs. The curve labeled "Glycine" shows a complementary increase in the concentration of glycine or glycine-related compounds as secondary degradation takes place.

From the foregoing experimental results it has been concluded that IDA and its homologues have some capability for chelating iron because the iron loss from the solution is far less than would be expected from the EDTA loss during the same period. It was also concluded that while IDA is capable of chelating iron, it is not able to support the cyclic hydrogen sulfide oxidation-catalyst regeneration process without gradual precipitation and loss of iron oxide.

Chelated iron solutions using other aminopolycarboxylic acid chelating agents including N-hydroxyethyl ethylenediamine triacetic acid (HEDTA), diethylenetriamine pentaacetic acid (DTPA), and nitrilotriacetic acid (NTA), which has a single nitrilo group, were also tested for chelate instability. All of them were found to exhibit similar chemical degradation characteristics when used in a cyclic hydrogen sulfide oxidation-catalyst regeneration process.

In accordance with the foregoing explanation of the chelate degradation mechanism, the steric inversion and consequent activation of the nitrogen atom in the chelated iron complex upon reduction of the iron to its ferrous state leads to rupture or decay of nitrogen-carbon bonds during subsequent oxidative regeneration of the catalyst solution. Other known iron chelating agents that are nitrogen-free, e.g. acetyl acetone or 2:4 pentandione, do not display the strong chelating action required to keep ferric iron in solution at neutral or moderately alkaline pH. Thus, the complex-forming tendencies of the nitrogen atom are not only the source of the chelate degradation problem but are also the distinguishing characteristic of the aminopolycarboxylic acid chelating agents that are most effective in a chelated iron hydrogen sulfide removal process. To improve the economic feasibility of the process it is therefore necessary to provide an effective method of inhibiting the tendency of the excited or activated nitrogen to undergo nitrogen-carbon bond rupture during oxidative regeneration of the catalyst solution.

Various organic and inorganic materials were investigated as possible stabilizing additives, but only a few materials were found that displayed significant effectiveness. When cost, toxicity, and environmental acceptability are also considered, we have found that the alkaline thiosulfates are by far the most useful and effective stabilizing agents to retard or inhibit degradation of the aminopolycarboxylic acid chelating agent. This discovery was particularly surprising because of the well documented belief of prior art workers that in situ formation of thiosulfate during the hydrogen sulfide removal process and accumulation of thiosulfate in the recirculating operating solution are highly undesirable occurrences that should be prevented to the extent possible. Prior to the present invention, it was not known that the incorporation of thiosulfate in the catalyst solution and maintaining the thiosulfate concentration at an appropriate level would reduce chelate degradation to an economically tolerable level during prolonged large scale operation of the hydrogen sulfide removal process.

Accordingly, a specific embodiment of the invention comprises utilizing an aqueous solution of an aminopolycarboxylic acid chelated polyvalent metal in a cyclic hydrogen sulfide removal-catalyst regeneration process, and incorporating in the solution an effective amount of an alkaline thiosulfate to retard or prevent ruputure of nitrogen-carbon bonds in the chelating agent during the catalyst regeneration step. By the term "alkaline thiosulfate", we intend to include the alkali metal thiosulfates, the alkaline earth metal thiosulfates, ammonium thiosulfate, and thiosulfate ion precursors comprising other sulfur-containing compounds capable of forming thiosulfate ions in situ in the operating solution, e.g. the hydrosulfides. From a practical standpoint considering availability and cost, ammonium thiosulfate or sodium thiosulfate will ordinarily be used in formulating the initial operating solution and also as additives from time to time if necessary in order to maintain a desired effective thiosulfate concentration during operation of the process.

The desired chelate stabilizing effect is obtained with a thiosulfate concentration in the operating solution that is within the range of from about 0.3 wt. % to about 30 wt. %, or from about 3 to about 300 g·L$^{-1}$, preferably from about 10 to about 50 g·L$^{-1}$. For best results at least one mole of thiosulfate should be present for each nitrogen atom in the chelated polyvalent metal complex, and preferably the mole ratio of thiosulfate to nitrogen should be on the order of 1.5:1 or 2:1 to insure effective stabilization.

The aminopolycarboxylic acid chelating agents used in the present invention include monoaminopolycarboxylic acids, polyaminopolycarboxylic acids, polyaminoalkyl polycarboxylic acids, and polyaminohydroxyalkyl polycarboxylic acids. Usually the aforementioned types of chelating agents, either singly or as a mixture, will be used in the form of their alkali metal salts, particularly the sodium salts. The polyaminopolyacetic acids and the polyaminohydroxyethyl polyacetic acids, or their sodium salts, are particularly desirable. Specific examples of useful chelating agents within the foregoing class are nitrilotriacetic acid (NTA), ethylenediaminetetraacetic acid (EDTA), N-hydroxyethyl ethylenediamine triacetic acid (HEDTA), and diethylenetriamine pentaacetic acid (DTPA).

A preferred embodiment of the present invention comprises the use of an aminopolycarboxylic acid chelating agent in combination with a polyhydroxy type chelating agent as disclosed in Thompson U.S. Pat. No. 4,189,462 which is incorporated herein by reference. The polyhydroxy type chelating agents include monosaccharides, disaccharides, reduced monosaccharides, reduced disaccharides, monosaccharide acids, and di-saccharide acids, and their alkali metal salts. In particular, sorbitol is a preferred chelating agent of this type. As explained in the Thompson patent, the combination of chelating agents insures that the iron will be retained in solution over a wide range of pH and other process conditions.

When nitrilotriacetic acid (NTA) is used as the aminopolycarboxylic acid chelating agent in accordance with the present invention, it has been found that two different complexes with ferric iron can be formed. One of these has one molecule of NTA per molecule of iron (the monomer form), and the other has two molecules of NTA per molecule of iron (the dimer form). We have found that when the monomer form of the NTA-iron complex is used in the cyclic hydrogen sulfide removal process, the degradation rate of the chelating agent is approximately the same as the degradation rate experienced with EDTA. Surprisingly, however, the use of sufficient NTA so that the iron is predominantly chelated with two moles of NTA per mole of iron results in a degradation rate as low as about one-third of the degradation rate experienced with EDTA. We have also found that the degradation retardant effect of alkaline thiosulfate incorporated in the catalyst solution is particularly impressive when the dimer form of the NTA-iron chelate complex is used.

Accordingly, the preferred embodiment of the invention comprises using an aqueous catalyst solution containing NTA and iron in a mole ratio of at least about 2:1 so as to insure that substantially all of the iron is present as the dimer form of the NTA-iron complex and incorporating in the solution an effective amount of an alkaline thiosulfate to substantially retard or prevent chelate degradation. By utilizing this preferred embodiment of the invention, it has been possible to reduce the loss of aminopolycarboxylic chelating agent to 10% or less of the loss heretofore experienced in large scale operation of the process using a combination of EDTA and HEDTA as the aminopolycarboxylic acid chelating agents and sorbitol as a polyhydroxy type chelating agent.

Figure 5:
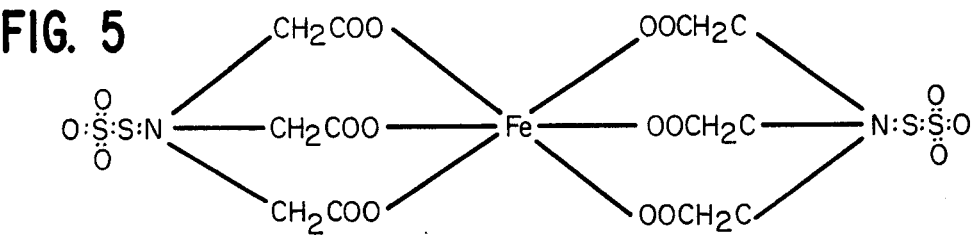
FIG. 5 is a schematic representation of the stabilized iron chelate complex used in the preferred embodiment of the invention.

In accordance with the mechanism previously described, the degradation of the aminopolycarboxylic acid chelating agent occurs as a result of the loss of an unpaired electron from the nitrogen during oxidative regeneration of the catalyst solution, and it is believed that the alkaline thiosulfate stabilizing agent retards or prevents such degradation by complexing or associating with the chelating agent and sharing the unpaired electron freed by the nitrogen atom during reduction of the iron from its ferric to its ferrous state. FIG. 5 is a schematic representation of the manner in which the thiosulfate ion is believed to be associated with the dimer form of the NTA-iron complex so as to stabilize the nitrogen atoms against bond rupture during oxidation of the reduced iron complex. In substantiation of the configuration shown in FIG. 5, we have found that as little as one mole of thiosulfate per mole of NTA in the NTA dimer has a remarkable stabilizing effect, whereas higher concentrations of thiosulfate are usually required in order to prevent unacceptable degradation of the chelating agent in a system using EDTA. Since the iron concentration in the operating solution may be easier to determine than the NTA concentration, it will sometimes be more convenient to monitor the thiosulfate concentration with reference to the iron content of the solution. For example, when utilizing the dimer form of the NTA-iron complex in accordance with the preferred embodiment of the invention, the mole ratio of thiosulfate to iron in the solution should be at least 2 and preferably at least 3.5.

In a specific formulation for the operating catalyst solution in accordance with the preferred embodiment of the invention, the solution having an iron content of about 1000 ppm also contains sufficient NTA to provide a mole ratio of NTA to iron of about 2:1, sufficient sodium or ammonium thiosulfate to provide a mole ratio of thiosulfate to iron of about 3.5:1, and sufficient sorbitol to provide a mole ratio of sorbitol to iron of about 0.5:1.

The Stretford process is a well known process for removal of hydrogen sulfide by means of an alkaline aqueous solution of a vanadium salt and anthraquinone disulfonate (ADA). It has been suggested in the Fenton et al Pat. No. 3,972,989 that the addition of thiosulfate ion to the solution as a sacrificial agent may reduce ADA consumption because of preferential oxidation of the thiosulfate by hydrogen peroxide produced during the operation of the process. In the present invention, however, we have found that there is no significant consumption or loss of the thiosulfate stabilizer, thereby demonstrating that the mechanism of stabilization is quite different from that proposed by Fenton et al for the Stretford process.

In practicing the present invention, the preferred procedure is to include the requisite amount of alkaline thiosulfate when formulating the initial operating catalyst solution. In this way, the fresh solution is stabilized from the outset, thereby minimizing the possibility of catalyst degradation during the initial stages of operation of the process during which time abnormal operating conditions and upsets are often encountered. In continuous operation of the process using a recirculating catalyst solution, the desired concentration of thiosulfate may be achieved and the concentration level may be maintained by withdrawing used solution or adding fresh amounts of thiosulfate if and when required. It is also within the scope of the present invention to utilize thiosulfate that is formed in situ during the use of the chelated polyvalent metal solution in the hydrogen sulfide removal process. Also, if desired, a small side stream may be withdrawn from the main body of circulating solution and subjected to conditions that promote the formation of thiosulfate (e.g. by oxidation), and thereafter the side stream may be recombined with the main circulating liquor.

In addition to the alkaline thiosulfates, certain lower molecular weight aliphatic alcohols may also be used as stabilizing additives to retard or prevent chelate degradation in accordance with the present invention. Preferred materials in this category are the monohydroxy alcohols having 3 to 5 carbon atoms, particularly the branched chain alcohols such as t-butanol and isopropanol. The dihydroxy alcohols such as ethylene glycol and propylene glycol may also be used. The concentration of the alcohol additives in the operating solution may be from about 20 to about 100 $g \cdot L^{-1}$.

Although the invention is described herein with particular emphasis on the use of iron as the polyvalent metal of choice, other polyvalent metals that form chelates with an aminopolycarboxylic acid chelating agent can also be used. Such additional polyvalent metals include copper, vanadium, manganese, platinum, tungsten, nickel, mercury, tin, and lead.

Any of the various methods well known in the art can be used to effect the required intimate contact between the hydrogen sulfide-containing gas and the aqueous catalyst solution, including an aerobic system in which the oxidation of hydrogen sulfide and the regeneration of the catalyst solution are carried out concurrently in the same reaction vessel, or an anaerobic system in which oxidation of hydrogen sulfide and regeneration of the catalyst solution are effected in separate vessels or reaction zones. Reference is made to the aforementioned Thompson patent for a detailed explanation of the two types of processing systems. The Hardison U.S. Pat. No. 4,238,462 describes an autocirculation process and apparatus suitable for practicing the present invention, and the Mancini et al U.S. Pat. No. 4,011,304 describes a control system for use in such process. The Hardison and the Mancini et al patents are also incorporated herein by reference.

The chelated iron solution of the present invention is preferably prepared by dissolving a suitable iron salt in water, separately dissolving the chelating agent in water, and mixing the two solutions to provide a concentrate. The pH of the concentrate is adjusted by adding the required amount of an alkaline material, such as sodium hydroxide or sodium carbonate, to provide a concentrate of desired neutral or alkaline pH. An appropriate amount of the concentrate can be diluted with water as required to obtain the desired amount of operating solution having the desired iron content. The required amount of alkaline thiosulfate is then added as a separate aqueous solution. The iron content of the operating solution can vary over a wide range, dependent upon the gas being treated and other factors. Typically, the iron content of the operating solution may be from about 5 ppm to about 5000 ppm, with 200 ppm to 2000 ppm being preferred. The amount of chelating agent should be at least sufficient to chelate all of the iron in the solution and preferably somewhat in excess of that amount. As previously explained, in the preferred embodiment of the invention NTA is used as the chelating agent in sufficient amount so that the iron is chelated predominantly with two moles of NTA per mole of iron. The mole ratio of NTA to iron should be at least about 2:1 to insure that substantially all of the iron is present as the dimer form of the NTA-iron complex, although acceptable results are obtained at slightly less than the 2:1 ratio.

The contacting of the hydrogen sulfide-containing gas with the operating solution in the hydrogen sulfide oxidation step is often carried out at ambient conditions of temperature and pressure, but temperatures of from about 5° to about 65° C. and pressures ranging from subatmospheric to 100 atmospheres or greater can be used. A pH ranging from about 5.5 to about 10.5 is usually maintained, although higher pH can be used particularly if the solution also contains a polyhydroxy type chelating agent as described in the Thompson U.S. Pat. No. 4,189,462. In an anaerobic system the regeneration of the catalyst solution is effected by contacting the used solution with air or other oxygen-containing gas at ambient conditions.

The following specific examples are presented to illustrate the invention but are not to be construed as limiting the scope of the invention.

EXAMPLE I

A small anaerobic pilot plant system having separate vessels for hydrogen sulfide absorption and catalyst regeneration was used to evaluate the effectiveness of sodium thiosulfate as a stabilizing additive in an aqueous NTA-iron chelate solution when used in a cyclic hydrogen sulfide removal-catalyst regeneration process. Each vessel was equipped with pH and redox potential meters. Comparable runs of 92 hours duration were made in parallel pilot plant units. One run was a test run in which the chelated iron solution contained the added thiosulfate stabilizer, and the other run was a control run in which no thiosulfate was added to the chelated iron solution. In the absorption vessel the catalyst solution was contacted with undiluted hydrogen sulfide gas, and in the regeneration vessel the used catalyst solution was contacted with air, the catalyst solution being recirculated continuously between the two vessels. The same flow rates for the recirculating catalyst solution and the same flow rates for the hydrogen sulfide gas were maintained in the respective runs. Unintentionally, the air flow rate in the regeneration vessel was higher in the control run than in the test run, but the redox potential in the regeneration vessel was substantially the same in each run so that the difference in air flow rate did not affect the chelate stability comparison.

In preparing the catalyst solution for the control run, ferric sulfate was dissolved in water and a separate solution of NTA (sodium salt) in water was prepared and the pH lowered from 11.0 to 6.3 with dilute sulfuric acid. The chelate solution was then added to the ferric sulfate solution and the pH adjusted to 7.0 with dilute sodium hydroxide. The resultant concentrate was diluted with sufficient water to obtain the required volume of operating solution having an iron content of about 1000 ppm and a 2:1 mole ratio of NTA to iron. A similar procedure was followed in preparing the catalyst solution for the test run except that sodium thiosulfate was dissolved in water and added to the catalyst solution to obtain a thiosulfate concentration of about 50 g·L$^{-1}$.

for analysis at 8 and 24 hour intervals, and the NTA concentration was determined by liquid chromatography. The results are shown in the following table.

TABLE 2

| Test | Additive Conc. (g·L$^{-1}$) | Elapsed Time (hr) | Original NTA (g·L$^{-1}$) | % NTA Remaining | NTA Degrad. Rate Constant (hr$^{-1}$) | NTA Half Life (hr) |
| --- | --- | --- | --- | --- | --- | --- |
| Control | None | 0.0 | 23.88 | 100.0 | — | — |
| | | 9.0 | 20.66 | 86.5 | — | — |
| | | 26.5 | 11.71 | 49.0 | 0.0270 | 25.8 |
| B (ethylene glycol) | 100 | 0.0 | 10.33 | 100.0 | — | — |
| | | 7.0 | 9.37 | 90.7 | — | — |
| | | 24.0 | 9.29 | 89.9 | 0.0034 | 156.8 |
| C (t-butanol) | 100 | 0.0 | 9.51 | 100.0 | — | — |
| | | 7.0 | 9.82 | 103.3 | — | — |
| | | 26.0 | 9.74 | 102.4 | 0 | — |

During the pilot plant runs, only one minimal addition of ammonium hydroxide was required in the test run to maintain the pH in the desired range of about 7.0, but in the control run numerous additions of ammonium hydroxide were necessary. Samples of the catalyst solution were withdrawn periodically for analysis, and the sulfur produced in the absorption vessel was removed from each pilot plant after 30, 53, and 75 hours of operation to insure troublefree performance. Production of sulfur (based on 100% conversion of hydrogen sulfide) was approximately the same in both runs.

Catalyst solution samples withdrawn during the pilot plant runs were quantitatively analyzed for NTA by liquid chromatography, for soluble iron by atomic absorption spectrophotometry, and for sodium thiosulfate by iodometry. The results of these analytical determinations are set forth in the following table.

TABLE 1

| Elapsed Time (hr) | NTA (g·L$^{-1}$) Test A | NTA (g·L$^{-1}$) Control | Fe Soluble (g·L$^{-1}$) Test A | Fe Soluble (g·L$^{-1}$) Control | Thiosulfate (g·L$^{-1}$) Test A | Thiosulfate (g·L$^{-1}$) Control |
| --- | --- | --- | --- | --- | --- | --- |
| 0.0 | 10.09 | 9.58 | 990 | 970 | 50.09 | 0.16 |
| 24.0 | 9.85 | 3.80 | 1005 | 985 | 50.24 | 0.16 |
| 47.0 | 9.22 | 0.74 | 970 | 895 | 50.09 | 0.32 |
| 69.0 | 10.43 | 0.00 | 950 | 850 | 50.40 | 0.32 |
| 92.5 | 8.73 | 0.00 | 900 | 660 | 50.40 | 0.54 |

From the foregoing data, it will be seen that the rate of degradation of NTA was very significantly reduced in the test run (Test A) in which the NTA concentration changed from 10.09 g·L$^{-1}$ to 8.73 g·L$^{-1}$ in 92.5 hours, whereas in the control run the NTA was totally degraded shortly after 47 hours. The suppression of NTA degradation is also evidenced by the higher concentrations of soluble iron maintained throughout Test A as compared with the control run. It is also seen from the foregoing table that no significant quantity of thiosulfate was produced in the control run and no thiosulfate was degraded or lost in Test A.

EXAMPLE II

Using the same pilot plant equipment of Example I, a series of tests of approximately 24 hours duration were conducted to determine the effect on chelate degradation rate of various possible stabilizing additives other than alkaline thiosulfates. The basic catalyst solution was an aqueous solution of NTA and iron in 2:1 mole ratio that was adjusted to a pH of approximately 7.0. A test solution was obtained by adding to the basic solution an appropriate quantity of the additive being tested and diluting with water to obtain a desired iron concentration. Samples of catalyst solution were withdrawn As seen in Table 2, t-butanol used in Test C was as effective as sodium thiosulfate in eliminating degradation of NTA, whereas in the control test in which no stabilizing additive was used, substantially 50% of the NTA was consumed. Highly effective results were also obtained in Test B using ethylene glycol as the additive, as shown by the fact that degradation of the NTA was limited to about 10%.

EXAMPLE III

In the same equipment used in the previous examples, a series of tests were made to determine the effect of thiosulfate concentration when used as a stabilizing additive in a 2:1 mole ratio solution of NTA and ferric sulfate. In each case the flow rates for catalyst solution, hydrogen sulfide feed gas, and oxidizing air were substantially the same. The analyses for NTA were conducted by liquid chromatography. The test results are shown in the following table.

TABLE 3

| Test | Elapsed Time (Hr) | Half Life (Hr) | Thiosulfate (g·L$^{-1}$) | Original Mole Ratio Fe:NTA:Na$_2$S$_2$O$_3$ | | | % NTA Remaining 24 Hrs | % NTA Remaining 48 Hrs. |
| --- | --- | --- | --- | --- | --- | --- | --- | --- |
| D | 170.5 | 435 | 50.0 | 1 | 2 | 17.7 | 100.0 | 100.0 |
| E | 24.0 | 423 | 25.0 | 1 | 2 | 8.8 | 96.1 | — |
| F | 47.5 | 456 | 12.5 | 1 | 2 | 4.4 | 97.2 | 93.0 |
| G | 71.5 | 184 | 6.3 | 1 | 2 | 2.2 | 88.3 | 81.2 |
| H | 71.5 | 178 | 3.1 | 1 | 2 | 1.1 | 82.6 | 78.9 |
| Control | 92.5 | 18 | 0.0 | 1 | 2 | — | 62.8 | 31.4 |

In Test H containing the lowest concentration of thiosulfate (3.1 g·L$^{-1}$, the NTA stability is significantly greater than that of the control run in which the solution contained no thiosulfate. The half life values reported in the table, although not strictly comparable because of the variations in total duration of the tests, indicate that the optimum thiosulfate concentration is of the order of 12.5 g·L$^{-1}$ under the pilot plant conditions. This is the lowest concentration of thiosulfate that maintains the NTA stability at a 24-fold improvement level over the control run. It is noted, however, that even at the lower thiosulfate levels, the improvement is 10-fold over the control run.

EXAMPLE IV

The effect of thiosulfate addition on degradation of EDTA in a chelated iron solution was also investigated in the same pilot plant equipment described in Example I. A catalyst concentrate was prepared using ferrous sulfate and EDTA (sodium salt) at a mole ratio of EDTA to iron of about 1.1:1 and adjusting to a pH of about 7.0. The operating solution for each test was prepared by diluting the concentrate to obtain an iron content of 1000 ppm and adding the desired amount of sodium thiosulfate.

The result of the tests are shown in the following table which also includes for comparison the results obtained in similar tests using an NTA iron solution having a 2:1 mole ratio of NTA to iron.

TABLE 4

| Test | Chelate | Sodium Thiosulfate (g.L$^{-1}$) | Chelate Half Life (Hr) |
|---|---|---|---|
| J | 2:1 NTA:Fe | 25.0 | 423 |
| K | 2:1 NTA:Fe | 3.1 | 178 |
| Control | 2:1 NTA:Fe | 0.0 | 18 |
| L | 1.1:1 EDTA:Fe | 25.0 | 74 |
| M | 1.1:1 EDTA:Fe | 50.0 | 127 |
| Control | 1.1:1 EDTA:Fe | 0.0 | 12 |

Although not directly comparable because of variations in the duration of the tests, it will be seen from the half life values in Table 4 that Tests L and M with added thiosulfate showed a six-fold to ten-fold increase in EDTA stability compared to the control run. While these results represent an excellent improvement, it will be noted from Test J that a 24-fold increase in chelate stability was obtained in a system using the NTA-iron dimer complex.

In summary, the present invention provides a highly effective, relatively inexpensive, and environmentally acceptable means of preventing excessive degradation of an aminopolycarboxylic acid chelating agent in an aqueous chelated polyvalent metal catalyst solution when used in a cyclic hydrogen sulfide removal-catalyst regeneration process. In contrast to the unacceptably high chelate consumption rates heretofore experienced in prolonged large-scale operation of the process, the present invention is capable of reducing the consumption of chelating agent to less than about 1-2% per day of the total amount of chelating agent in the operating solution. Under normal operating conditions the cost of replacement chelating agent will not exceed about $75 per ton of sulfur produced.

We claim:

1. A method of preventing excessive degradation of chelating agent during prolonged continuous operation of a hydrogen sulfide removal process using a chelated polyvalent metal catalyst solution wherein an aqueous solution of a polyvlent metal chelated with at least one chelating agent comprising an aminopolycarboxylic acid is contacted with a hydrogen sulfide-containing fluid stream to effect oxidation of the hydrogen sulfide to elemental sulfur and concomitant reduction of said polyvalent metal from its higher valence state to its lower valence state, and wherein the catalyst solution is regenerated by contacting said solution with an oxygen-containing gas to oxidize said polyvalent metal from its lower valence state to its higher valence state, and wherein said chelating agent is susceptible to rapid progressive degradation by rupture of nitrogen-carbon bonds during the process, thereby necessitating addition of replacement chelating agent, said method comprising the steps of:
incorporating in said catalyst solution an effective concentration of a stabilizing agent sufficient to retard the rate of degradation or to prevent degradation of said aminopolycarboxylic acid chelating agent during operation of the process, said stabilizing agent being selected from the group consisting of alkaline thiosulfates and dihydroxy alcohols having 2 to 3 carbon atoms; and maintaining said effective concentration of said stabilizing agent in said catalyst solution substantially throughout the operation of the process for at least about 170 hours by incorporating additional amounts of stabilizing agent in said solution or withdrawing used solution if and when required.

2. The process of claim 1 further characterized in that a nitrogen bond in the chelate complex is freed during reduction of the polyvalent metal to its lower valence state, thereby providing a nitrogen atom with an unpaired electron, and wherein said stabilizing agent is capable of complexing with the chelating agent and sharing said unpaired electron so as to retard or prevent rupture of the bond between said nitrogen atom and a carbon atom during subsequent regeneration of the catalyst solution.

3. A method of preventing excessive degradation of chelating agent during prolonged continuous operation of a hydrogen sulfide removal process using a chelated polyvalent metal catalyst solution wherein an aqueous solution of a polyvalent metal chelated with at least one chelating agent comprising an aminopolycarboxylic acid is contacted with a hydrogen sulfide-containing fluid stream to effect oxidation of the hydrogen sulfide to elemental sulfur and concomitant reduction of said polyvalent metal from its higher valence state to its lower valence state, and wherein the catalyst solution is regenerated by contacting said solution with an oxygen-containing gas to oxidize said polyvalent metal from its lower valence state to its higher valence state, and wherein said chelating agent is susceptible to rapid progressive degradation by rupture of carbon-nitrogen bonds during the process, thereby necessitating addition of replacement chelating agent, said method comprising the steps of:
incorporating in said catalyst solution an effective concentration of an alkaline thiosulfate stabilizing agent sufficient to retard the rate of degradation or to prevent degradation of said aminopolycarboxylic acid chelating agent during operation of the process; and maintaining said effective concentration of said alkaline thiosulfate stabilizing agent in said catalyst solution substantially throughout the operation of the process for at least about 170 hours by incorporating additional amounts of said alkaline thiosulfate in said solution or withdrawing used solution if and when required.

4. The process of claim 3, wherein said alkaline thiosulfate is incorporated in the initial operating solution and is present at said effective concentration throughout the operation of the process.

5. The process of claim 3, wherein said alkaline thiosulfate is selected from the group consisting of alkali metal thiosulfates, alkaline earth metal thiosulfates, ammonium thiosulfate, and thiosulfate ion precursors.

6. The process of claim 3, wherein said polyvalent metal is iron and the iron content of said solution is from about 5 to about 5000 ppm.

7. The process of claim 3, wherein said chelating agent is selected from the group consisting of monoaminopolycarboxylic acids, polyaminopolycarboxylic acids, polyaminoalkyl polycarboxylic acids, polyaminohydroxyalkyl polycarboxylic acids, and their alkali metal salts.

8. The process of claim 3, wherein said solution also contains a polyhydroxy chelating agent.

9. The process of claim 3, wherein oxidation of hydrogen sulfide and regeneration of the catalyst solution are effected in separate reaction zones.

10. The process of claim 3, wherein the concentration of thiosulfate in said solution is from about 3 to about 300 g·L$^{-1}$.

11. The process of claim 3, wherein the concentration of thiosulfate in said solution is from about 10 to about 50 g·L$^{-1}$.

12. The process of claim 3, wherein said catalyst solution has a neutral or alkaline pH.

13. The process of claim 8, wherein said polyhydroxy chelating agent comprises sorbitol.

14. A method of preventing excessive degradation of chelating agent during prolonged operation of a hydrogen sulfide removal process using a chelated polyvalent metal catalyst solution wherein an aqueous solution of a polyvalent metal chelated with at least one chelating agent comprising nitrilotriacetic acid is contacted with a hydrogen sulfide-containing fluid stream to effect oxidation of the hydrogen sulfide to elemental sulfur and concomitant reduction of said polyvalent metal from its higher valence state to its lower valence state, and wherein the catalyst solution is regenerated by contacting said solution with an oxygen-containing gas to oxidize said polyvalent metal from its lower valence state to its higher valence state, and wherein said nitrilotriacetic acid chelating agent is susceptible to rapid progressive oxidation by rupture of nitrogen-carbon bonds during the process, thereby necessitating addition of replacement chelating agent, said method comprising the steps of:
incorporating in said catalyst solution an effective concentration of an alkaline thiosulfate stabilizing agent sufficient to retard the rate of degradation or to prevent degradation of said nitrilotriacetic acid chelating agent during operation of the process; and maintaining said effective concentration of said alkaline thiosulfate stabilizing agent in said catalyst solution substantially throughout the operation of the process for at least about 170 hours by incorporating additional amounts of said alkaline thiosulfate in said solution or withdrawing used solution if and when required.

15. The process of claim 14, wherein the mole ratio of nitrilotriacetic acid to polyvalent metal in said solution is at least about 2:1.

16. The process of claim 14, wherein said polyvalent metal is iron and the mole ratio of nitrilotriacetic acid to iron in said solution is at least about 2:1, whereby the iron is predominantly chelated with two moles of nitrilotriacetic acid per mole of iron.

17. The process of claim 16, wherein said alkaline thiosulfate is selected from the group consisting of alkali metal thiosulfates, alkaline earth metal thiosulfates, ammonium thiosulfate, and thiosulfate ion precursors.

18. The process of claim 16, wherein the mole ratio of thiosulfate to nitrilotriacetic acid is at least about 1:1.

19. The process of claim 16, wherein said catalyst solution comprises from about 5 to about 5000 ppm of iron.

20. The process of claim 16, wherein the concentration of thiosulfate in said solution is from about 3 to about 300 g·L$^{-1}$.

21. The process of claim 16, wherein the concentration of thiosulfate in said solution is from about 10 to about 50 g·L$^{-1}$.

22. The process of claim 16, wherein said catalyst solution comprises about 1000 ppm of iron, said thiosulfate is sodium or ammonium thiosulfate in an amount sufficient to provide a mole ratio of thiosulfate to iron of about 3,5:1, and said solution also contains sorbitol in an amount sufficient to provide a mole ratio of sorbitol to iron of about 0.5:1.

23. The process of claim 14, wherein said alkaline thiosulfate is incorporated in the initial operating solution and is present at said effective concentration throughout the operation of the process.

24. The process of claim 14, wherein oxidation of hydrogen sulfide and regeneration of the catalyst solution are effected in separate reaction zones.

25. A method of preventing excessive degradation of chelating agent during prolonged continuous operation of a hydrogen sulfide removal process using a chelated polyvalent metal catalyst solution wherein an aqueous solution of a polyvalent metal chelated with at least one chelating agent comprising an aminopolycarboxylic acid is contacted with a hydrogen sulfide-containing fluid stream to effect oxidation of the hydrogen sulfide to elemental sulfur and concomitant reduction of said polyvalent metal from its higher valence state to its lower valence state, and wherein the catalyst solution is regenerated by contacting said solution with an oxygen-containing gas to oxidize said polyvalent metal from its lower valence state to its higher valence state, and wherein said chelating agent is susceptible to rapid progressive degradation by rupture of carbon-nitrogen bonds during the process, thereby necessitating addition of replacement chelating agent, said method comprising the steps of:
incorporating in said catalyst solution an effective concentration of an aliphatic alcohol stabilizing agent sufficient to retard the rate of degradation or to prevent degradation of said aminopolycarboxylic acid chelating agent during operation of the process, said aliphatic alcohol being selected from the group consisting of dihydroxy alcohols having 2 to 3 carbon atoms; and maintaining said effective concentration of said aliphatic alcohol stabilizing agent in said catalyst solution substantially throughout the operation of the process for at least about 170 hours by incorporating additional amounts of said aliphatic alcohol in said solution or withdrawing used solution if and when required.

26. The process of claim 25, wherein said polyvalent metal is iron.

27. The process of claim 25, wherein said chelating agent is selected from the group consisting of monoaminopolycarboxylic acids, polyaminopolycarboxylic acids, polyaminoalkyl polycarboxylic acids, polyaminohydroxyalkyl polycarboxylic acids, and their alkali metal salts.

28. The process of claim 25, wherein said chelating agent comprises nitrilotriacetic acid.

29. The process of claim 25, wherein said solution also contains a polyhydroxy chelating agent.

30. The process of claim 25, wherein said stabilizing agent comprises ethylene glycol.

31. The process of claim 25, wherein said aliphatic alcohol is incorporated in the initial operating solution and is present at said effective concentration throughout the operation of the process.

32. The process of claim 25, wherein oxidation of hydrogen sulfide and regeneration of the catalyst solution are effected in separate reaction zones.

33. The process of claim 25, wherein the concentration of said alcohol in said solution is from about 20 to about 100 g·L$^{-1}$.

34. A redox catalyst composition for use in a process for removing hydrogen sulfide by oxidation to elemental sulfur comprising a neutral or alkaline aqueous solution of iron chelated with nitrilotriacetic acid, said nitrilotriacetic acid being susceptible to rapid progressive degradation by rupture of carbon-nitrogen bonds during the process, the mole ratio of nitrilotriacetic acid to iron being at least about 2:1 so that the iron is predominantly chelated with two moles of nitrilotriacetic acid per mole of iron, and said solution also containing an effective concentration of an alkaline thiosulfate stabilizing agent sufficient to retard the rate of degradation or to prevent degradation of the nitrilotriacetic acid chelating agent during operation of the process for at least about 170 hours.

35. The catalyst composition of claim 34, wherein the iron content of said solution is from about 5 to about 5000 ppm and the mole ratio of thiosulfate to nitrilotriacetic acid is at least about 1:1.

36. The catalyst composition of claim 34, wherein the concnetration of said alkaline thiosulfate is from about 3 to about 300 g·L$^{-1}$.

37. The catalyst composition of claim 34, wherein the concentration of said alkaline thiosulfate is from about 10 to about 50 g·L$^{-1}$.

38. The catalyst composition of claim 34, wherein the iron content of said solution is about 1000 ppm, said alkaline thiosulfate is sodium or ammonium thiosulfate in an amount sufficient to provide a mole ratio of thiosulfate to iron of about 3.5:1, and said solution also contains sorbitol in an amount sufficient to provide a mole ratio of sorbitol to iron of about 0.5:1.

39. The catalyst composition of claim 34, wherein said solution also contains a polyhydroxy chelating agent.

40. The catalyst composition of claim 39, wherein said polyhydroxy chelating agent comprises sorbitol.

* * * * *

UNITED STATES PATENT AND TRADEMARK OFFICE
CERTIFICATE OF CORRECTION

PATENT NO. : 4,622,212
DATED : November 11, 1986
INVENTOR(S) : Derek McManus and Frederick R. Kin It is certified that error appears in the above–identified patent and that said Letters Patent are hereby corrected as shown below:

Column 1, line 56, change "99,799 and 99,800" to --999,799 and 999,800--.

Column 15, line 34 (Claim 14), delete "oxidation" and insert --degradation--.

Column 16, line 11 (Claim 22), delete "3,5:1" and insert --3.5:1--.

Signed and Sealed this

Eleventh Day of August, 1987

Attest:

Attesting Officer

DONALD J. QUIGG

Commissioner of Patents and Trademarks